United States Patent
Huang et al.

(10) Patent No.: US 11,875,424 B2
(45) Date of Patent: Jan. 16, 2024

(54) POINT CLOUD DATA PROCESSING METHOD AND DEVICE, COMPUTER DEVICE, AND STORAGE MEDIUM

(71) Applicant: SHENZHEN UNIVERSITY, Guangdong (CN)

(72) Inventors: Hui Huang, Shenzhen (CN); Pengdi Huang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 49 days.

(21) Appl. No.: 17/735,888

(22) Filed: May 3, 2022

(65) Prior Publication Data

US 2022/0292728 A1 Sep. 15, 2022

Related U.S. Application Data

(63) Continuation of application No. PCT/CN2021/082250, filed on Mar. 23, 2021.

(30) Foreign Application Priority Data

Mar. 15, 2021 (CN) .......................... 202110274439.3

(51) Int. Cl.
*G06T 9/00* (2006.01)
*G06V 20/58* (2022.01)
(Continued)

(52) U.S. Cl.
CPC .......... *G06T 9/002* (2013.01); *G06V 10/7715* (2022.01); *G06V 20/58* (2022.01); *G06V 20/64* (2022.01); *G06V 20/70* (2022.01)

(58) Field of Classification Search
None
See application file for complete search history.

(56) References Cited

U.S. PATENT DOCUMENTS

| 2014/0043329 A1* | 2/2014 | Wang ...................... G06T 17/20 345/420 |
| 2020/0050825 A1* | 2/2020 | Mendoza-Schrock ...................... G06V 20/17 |

FOREIGN PATENT DOCUMENTS

| CN | 109118564 A | 1/2019 |
| CN | 109859256 A | 6/2019 |

(Continued)

OTHER PUBLICATIONS

D. Karimi and S. E. Salcudean, "Reducing the Hausdorff Distance in Medical Image Segmentation With Convolutional Neural Networks," in IEEE Transactions on Medical Imaging, vol. 39, No. 2, pp. 499-513, Feb. 2020, doi: 10.1109/TMI.2019.2930068. (Year: 2020).*

(Continued)

*Primary Examiner* — Peter Hoang
(74) *Attorney, Agent, or Firm* — Polsinelli PC

(57) ABSTRACT

A point cloud data processing method and device, a computer device and a storage medium are provided. The method includes: acquiring point cloud data, and constructing a corresponding neighboring point set for each of data points in the point cloud data; calculating Hausdorff distances between the neighboring point set and a pre-constructed kernel point cloud to obtain a distance matrix; calculating a convolution of the neighboring point set with the distance matrix and a network weight matrix in a Hausdorff convolution layer in an encoder, to obtain high-dimensional point cloud features, the encoder and a decoder being two parts in a deep learning network; and reducing feature dimension of the high-dimensional point cloud features through the decoder, so that a classifier performs semantic classification on the point cloud data according to (Continued)

object point cloud features obtained by the dimension reduction.

20 Claims, 6 Drawing Sheets

(51) Int. Cl.
*G06V 10/77* (2022.01)
*G06V 20/64* (2022.01)
*G06V 20/70* (2022.01)

(56) References Cited

FOREIGN PATENT DOCUMENTS

| CN | 110321910 A | 10/2019 |
| CN | 111028327 A | 4/2020 |
| CN | 112215231 A | 1/2021 |
| WO | 2021/009258 A1 | 1/2021 |

OTHER PUBLICATIONS

Huang et al., "Hausdorff Point Convolution with Geometric Priors," Dec. 2020; arXiv:2012.13118v1; https://doi.org/10.48550/arXiv.2012.13118; pp. 1-10 (Year: 2020).*
International Search Report dated Dec. 1, 2021 issued in corresponding Parent Application No. PCT/CN2021/082250 (4 pages).
PCT/ISA/220 dated Dec. 1, 2021 issued in corresponding Parent Application No. PCT/CN2021/082250 (1 page).
PCT/ISA/237 dated Dec. 1, 2021 issued in corresponding Parent Application No. PCT/CN2021/082250 (4 pages).
Qingcan, "Research on Registration Algorithm of 3D Point cloud Data", A thesis submitted to Xidian University In partial fulfillment of the requirements for the degree of Master in Optical Engineering, Dec. 2015, 84 pages, w/ English Abstract.

* cited by examiner convolution with a first kernel point cloud convolution with a second kernel point cloud

POINT CLOUD DATA PROCESSING METHOD AND DEVICE, COMPUTER DEVICE, AND STORAGE MEDIUM

CROSS-REFERENCE TO RELATED APPLICATIONS

This application claims to the priority of Chinese Patent Application No. 2021102744393, filed on Mar. 15, 2021. This application is a continuation of international patent application PCT/CN2021/082250, entitled "Point Cloud Data Processing Method and Device, Computer Device, and Storage Medium", filed on Mar. 23, 2021, the entire contents of which are incorporated herein by reference.

TECHNICAL FIELD

The present disclosure relates to a point cloud data processing method, a point cloud data processing device, a computer device, and a storage medium.

BACKGROUND

With the development of computer graphics, a point cloud data semantic classification technology has emerged. The point cloud data semantic classification technology includes extracting the features of data points in the point cloud data, and performing semantic classification on the point cloud data according to the extracted features. In the conventional method, a regular sub-sampling is performed on the point cloud data, and the point cloud data is regularized at a lower resolution, and then the feature extraction and the semantic classification are performed on the regularized point cloud data. However, the conventional method causes the point cloud data to be even sparser, thus resulting in lower accuracy of the semantic classification.

SUMMARY

According to various embodiments, a first aspect of the present disclosure provides a point cloud data processing method. The method includes following steps.

Point cloud data is acquired, and a corresponding neighboring point set for each of query point in the point cloud data is constructed.

Hausdorff distances between the neighboring point set and a priori kernel point cloud are calculated, to obtain the shortest distance matrix.

A convolution of the neighboring point set with the shortest distance matrix and a network weight matrix in a Hausdorff convolution layer in an encoder is calculated, to obtain high-dimensional point cloud features. The encoder and a decoder are two parts in a deep learning network.

Feature dimension of the high-dimensional point cloud features is reduced through the decoder, so that a classifier performs semantic classification on the point cloud data according to object point cloud features obtained by the dimension reduction.

According to various embodiments, a second aspect of the present disclosure provides a point cloud data processing device. The device includes an acquiring module, a distance calculation module, a convolution calculation module, and a feature dimension reduction module.

The acquiring module is configured to acquire point cloud data, and construct a corresponding neighboring point set for each of data points in the point cloud data.

The distance calculation module is configured to calculate Hausdorff distances between the neighboring point set and a pre-constructed kernel point cloud to obtain a distance matrix.

The convolution calculation module is configured to calculate a convolution of the neighboring point set with the distance matrix and a network weight matrix in a Hausdorff convolution layer in an encoder to obtain high-dimensional point cloud features, and the encoder and a decoder being two parts in a deep learning network.

The feature dimension reduction module is configured to reduce feature dimension of the high-dimensional point cloud features through the decoder, so that a classifier performs semantic classification on the point cloud data according to object point cloud features obtained by the dimension reduction.

According to various embodiments, a third aspect of the present disclosure provides a computer device. The computer device includes a memory storing a computer program, and a processor. The processor, when executing the computer program, performs steps of the point cloud data processing method.

According to various embodiments, a fourth aspect of the present disclosure provides a non-transitory computer-readable storage medium, on which a computer program is stored. The computer program, when executed by a processor, causes the processor to perform steps of the point cloud data processing method.

Details of one or more embodiments of the present disclosure will be given in the following description and attached drawings. Other features and advantages of the present disclosure will become apparent from the description, drawings, and claims.

BRIEF DESCRIPTION OF THE DRAWINGS

In order to illustrate the technical solutions of the embodiments of the present disclosure more clearly, the accompanying drawings that need to be used in the embodiments are briefly introduced below. Apparently, the drawings in the following description only illustrate some embodiments of the present disclosure. For those of ordinary skill in the art, other drawings may also be obtained according to these drawings without any creative effort.

DETAILED DESCRIPTION OF THE EMBODIMENTS

In order to make the objective, technical solutions and advantages of the present disclosure clearer and better understood, the present disclosure will be further described in detail below with reference to the accompanying drawings and embodiments. It should be understood that the specific embodiments described herein are only used to illustrate the present disclosure, but not intended to limit the present disclosure.

It should be noted that the terms "first", "second" and the like in the description and claims of the present disclosure and the above drawings are used to distinguish similar objects, and are not necessarily used to describe a specific sequence or precedence order. It is to be understood that the data used in such a way may be interchanged when appropriate, such that the embodiments of the present disclosure described herein may be implemented in sequences other than those illustrated or described herein.

Figure 1:
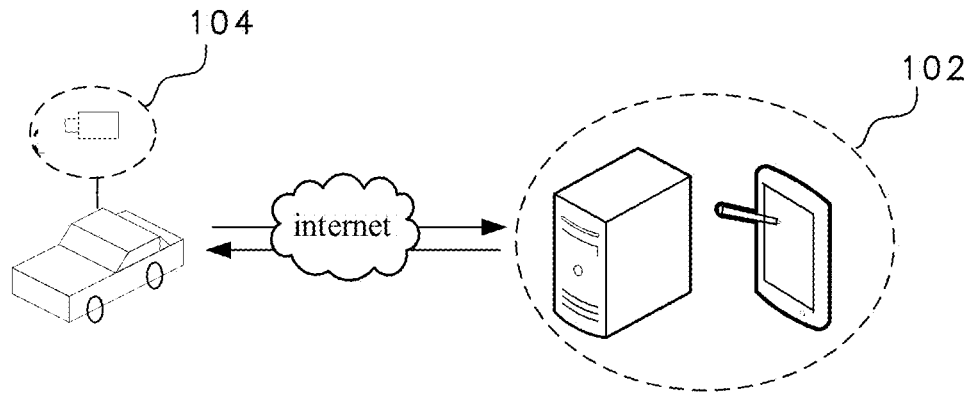
FIG. 1 is a diagram showing an application environment of a point cloud data processing method according to an embodiment.

A point cloud data processing method according to this disclosure may be applied to an application environment shown in FIG. 1. A computer device 102 communicates with a point cloud acquisition device 104 through a network, acquires point cloud data from the point cloud acquisition device 104, and constructs a corresponding neighboring point set for each of data points in the point cloud data. Then, the computer device 102 calculates Hausdorff distances between the neighboring point set and a pre-constructed kernel point cloud, to obtain a distance matrix, and calculates the convolution of the neighboring point set with the distance matrix and a network weight matrix in a Hausdorff convolution layer in an encoder, to obtain high-dimensional point cloud features. Finally, the computer device 102 reduces feature dimension of the high-dimensional point cloud features by means of a decoder, so that a classifier performs semantic classification on the point cloud data according to object point cloud features obtained by the dimension reduction. The computer device 102 may be a terminal or a server. The terminal may be, but is not limited to, various personal computers, notebook computers, smart phones, tablet computers and portable wearable devices. The server may be implemented by an independent server or a server cluster composed of multiple servers. The point cloud acquisition device 104 may be any device capable of acquiring point cloud data, for example, a lidar, a three-dimensional laser scanner, an RGBD depth camera, and the like.

Figure 2:
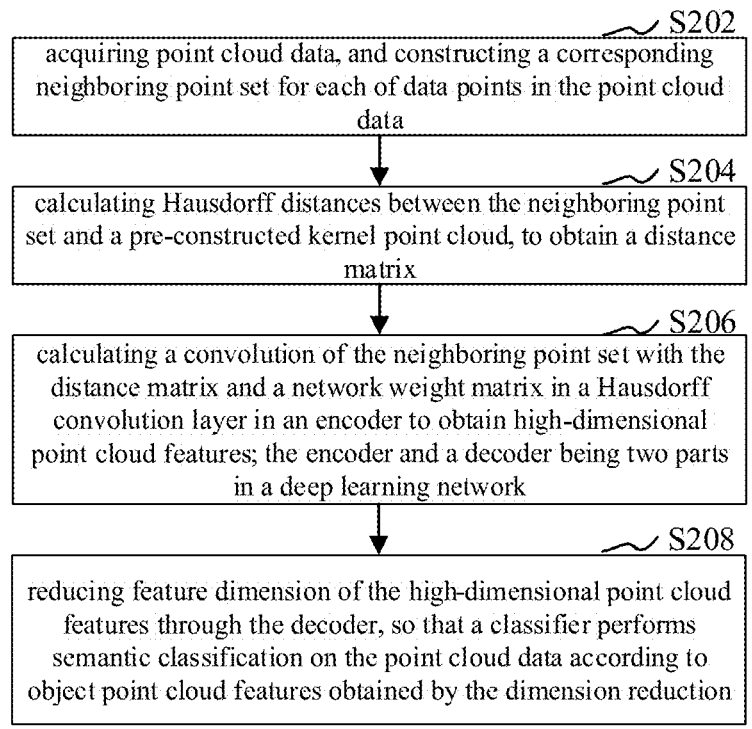
FIG. 2 is a schematic flowchart of the point cloud data processing method according to an embodiment.

In an embodiment, as shown in FIG. 2, a point cloud data processing method is provided. Taking the method applied to the computer device in FIG. 1 as an example to illustrate, the method includes following steps S202 to S208.

At step S202, a computer device acquires point cloud data, and constructs a corresponding neighboring point set for each of data points in the point cloud data.

The point cloud data is data obtained by scanning objects in space by a point cloud acquisition device. The point cloud data includes a plurality of data points. Each data point includes position coordinates of the data point and features of the data point. The features of the data points include color features, intensity features, the number of laser echoes, etc. The color features may be, for example, color RGB values. In an embodiment, the point cloud data is three-dimensional point cloud data, in particular, it may be three-dimensional single-frame point cloud data. The three-dimensional single-frame point cloud data is relatively sparse, and an interval between data lines is relatively large. In an embodiment, the point cloud data may be data obtained by scanning objects in a road environment by a lidar on a driverless vehicle. In another embodiment, the point cloud data may be data obtained by scanning objects in a space environment by a depth camera on an artificial intelligence robot.

Figure 3A:
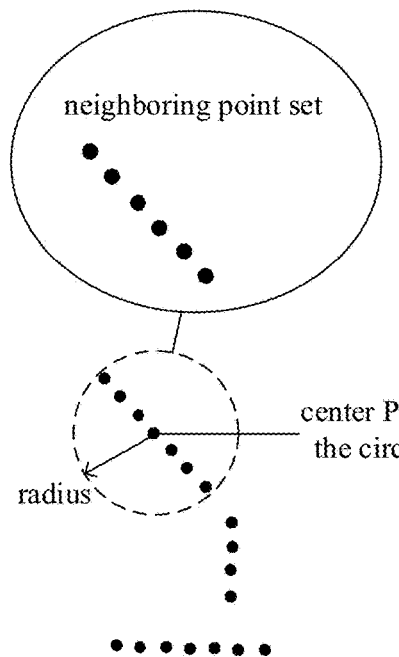
FIG. 3a is a schematic diagram showing a neighboring point set according to an embodiment.

The neighboring point set corresponding to a data point is a point cloud composed of data points in a region centered on the data point. For example, as shown in FIG. 3*a*, the neighboring point set is composed of data points in a circular region with a center of a data point $p_0$ and with a distance away from the center of a circle being less than a radius of the circle. The data points in the neighboring point set include x, y, and z coordinates of the data points and the features of the data points.

At step S204, the computer device calculates Hausdorff distances between the neighboring point set and a pre-constructed kernel point cloud to obtain a distance matrix.

Figure 3B:
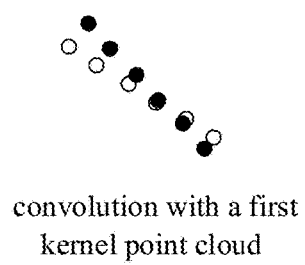
FIG. 3b is a schematic diagram showing convolution of a neighboring point set and a kernel point cloud 1 according to an embodiment.
Figure 3C:
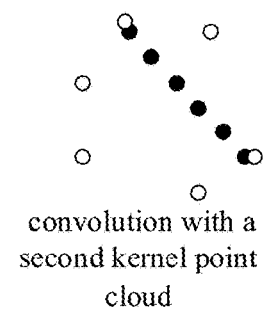
FIG. 3c is a schematic diagram showing convolution of a neighboring point set and a kernel point cloud 2 according to an embodiment.

The kernel point cloud is a point cloud with a certain geometric shape. For example, the kernel point cloud may have a basic geometric shape, including point, line, surface, or three-dimensional geometric shape. The kernel point cloud may have normalized dimensions, for example, the radius of the kernel point cloud is 1. The computer device may obtain the kernel point cloud by sampling the model of the basic geometric shape. For example, the computer device samples a line model, extracts a specific number of data points, and constructs a kernel point cloud from the extracted data points. The line model may be, for example, a function representing a line. The computer device may also sample the surface model, and construct a kernel point cloud from the extracted data points. As shown in FIGS. 3*b* and 3*c*, the solid points belong to the neighboring point set, and the hollow points belong to the kernel point cloud. FIGS. 3*b* and 3*c* are schematic diagrams showing a three-dimensional Hausdorff convolution of the neighboring point set with a first kernel point cloud, and a three-dimensional Hausdorff convolution of the neighboring point set with a second kernel point cloud, respectively.

The Hausdorff distance is a distance between compact subsets in a metric space and is used to calculate the similarity between two point clouds. The distance matrix is a matrix composed of the distances between the data points in the neighboring point set and the data points in the kernel point cloud, which represents the similarity between the kernel point cloud and the neighboring point set. For example, the distance matrix is M, $m_{i,j} \in M$, $m_{i,j}$ represents a distance between the i-th data point in the neighboring point set and the j-th data point in the kernel point cloud. When m is neither the shortest distance from the i-th data point in the neighboring point set to the kernel point cloud, nor the shortest distance from the j-th data point in the kernel point cloud to the neighboring point cloud, the distance $m_{i,j}$ will be set to 0.

At step S206, the computer device calculates a convolution of the neighboring point set with the distance matrix and a network weight matrix in a Hausdorff convolution layer in an encoder, to obtain high-dimensional point cloud features. The encoder and a decoder are two parts in the deep learning network.

The network weight matrix is a matrix that weights the result of the convolution of the neighboring point set with the distance matrix. The Hausdorff convolution layer is a convolution layer that calculates the convolution through the Hausdorff convolution algorithm. The Hausdorff convolution algorithm calculates the convolution of the features of the input data points with the distance matrix and the network weight matrix. The computer device calculates the convolution of the neighboring point set with the distance matrix, which is equivalent to weighting the features of the neighboring point set with the distance matrix firstly, and then with the network weight matrix, to extract more abstract high-dimensional point cloud features.

The encoder may include multiple Hausdorff convolution layers. The extracted features of each of the Hausdorff convolutional layer are inputted into the next Hausdorff convolutional layer for feature extraction, so that high-dimensional semantic features may be extracted through the multiple Hausdorff convolutional layers. In an embodiment, each Hausdorff convolutional layer in the encoder includes multiple Hausdorff convolution modules. The different Hausdorff convolution modules have different query scales. That is, when each of the Hausdorff convolution modules performs the convolution calculation, query radii for different neighboring point sets are different, so that multi-scale deep feature extraction and abstraction may be performed. The processing process of the decoder is opposite to that of the encoder. The decoder reduces the dimension of the high-dimensional semantic features, and the features with reduced dimension are inputted into the classifier for semantic classification.

At step S208, the computer device reduces feature dimension of the high-dimensional point cloud features through the decoder, so that the classifier performs the semantic classification on the point cloud data according to object point cloud features obtained by reducing the dimension.

The reducing the dimension of the feature is to reduce the data size of features. In an embodiment, in the encoder, each Hausdorff convolutional layer may include two Hausdorff convolution modules. After being convolved with the first Hausdorff convolution module, the output features remain the same size, which is still $c_{in}$, while after being convolved with the second Hausdorff convolution module, the output features have a size of $2*c_{in}$, and the decoder reduces the size of the features from $2*c_{in}$ to $c_{in}$.

The semantic classification is to add a semantic label to each of the data point in the point cloud data, so as to classify the data points into different semantic categories by the added semantic labels. For example, the point cloud data is the point cloud data of the space environment acquired by the lidar on an unmanned vehicle, and there are people, vehicles, and houses in the space environment. The computer device may perform the semantic classification on the point cloud data by means of adding red labels to the data points representing the people in the point cloud data, adding blue labels to the data points representing the vehicles in the point cloud data, and adding green labels to the data points representing the houses in the point cloud data.

In the above embodiments, the computer device acquires the point cloud data, constructs the corresponding neighboring point set for each of the data points in the point cloud data, and then calculates the Hausdorff distances between the neighboring point set and the pre-constructed kernel point cloud, to obtain the distance matrix. The computer device calculates the convolution of the neighboring point set with the distance matrix and the network weight matrix in the Hausdorff convolution layers in the encoder, to obtain the high-dimensional point cloud features. Then, the decoder reduces the dimension of the high-dimensional point cloud features, so that the classifier may perform the semantic classification on the point cloud data according to the object point cloud features obtained by reducing the dimensional. The computer device obtains the distance matrix by calculating the Hausdorff distances, calculates the convolution of the neighboring point cloud with the distance matrix, and then weights the result of the convolution calculation with the network weight matrix, to obtain the final high-dimensional point cloud features, so as to realize the feature extraction of the point cloud data. In this way, the extracted high-dimensional point cloud features have high accuracy, and thus the result of the semantic classification, performed by the computer device based on the obtained high-dimensional point cloud features, has high accuracy.

In an embodiment, the point cloud data P is inputted into the Hausdorff convolution layer, and this point cloud data includes the x, y, and z coordinates of each of the data points, and the features including the color, the intensity, the number of laser echoes, etc., carried by each of the data points. The size of the data matrix formed by the point cloud data P is $n_p \times (3+c_{raw})$, where $n_p$ is the number of the data points in the point cloud data P, and $c_{raw}$ is the feature dimension of the data points. For example, if each of the data points carries three kinds of features, the feature dimension is 3. Assuming that Q denotes the neighboring point set of the data point $p_i$ in the point cloud data, $n_q$ denotes the number of the data points in the neighboring point set Q, then the size of the data matrix formed by the neighboring point set Q is $n_q \times (3+c_{raw})$. $C_{in}$ denotes the feature matrix formed by the features of each of the data points in the neighboring point set Q, G denotes the pre-constructed kernel point cloud for the neighboring point set Q, $n_g$ denotes the number of the data points in the pre-constructed kernel point cloud G, $M_{min}$ denotes the distance matrix calculated according to the neighboring point set Q and the kernel point cloud G, and W denotes the network weight matrix, then the computer device calculates the features of the data point $p_i$ by Equation (1).

$$C_{out} = \max_{i=0}^{n_q}(M_{min} * C_{in} * W) \qquad (1)$$

Where, the size of $M_{min}$ is $n_g \times n_q$, and $C_{out}$ denotes the calculated feature of the data point $p_i$. The network weight matrix W has a size of $(3+c_{raw}) \times c_{out}$. The matrix is obtained by the convolution of $M_{min} * C_{in} * W$. The computer device obtains the maximum value of the elements in the matrix through the max function, which is used as the feature of the extracted data point $p_i$. In an embodiment, the computer device may replace the max function in the Equation (1) with a min function or a sum function.

Figure 4:
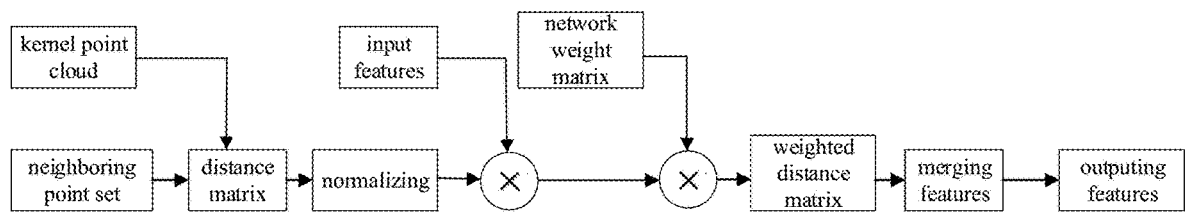
FIG. 4 is a schematic flowchart of a convolution calculation according to an embodiment.

In an embodiment, as shown in FIG. 4, when the computer device calculates the convolution, the distance matrix is firstly calculated according to the kernel point cloud and the neighboring point set, and then the distance matrix is normalized. Then, the feature matrix corresponding to the neighboring point set is convolved with the normalized distance matrix, and the result of the convolution is convolved with the network weight matrix again to obtain the weighted distance matrix. The computer device merges the features of the weighted distance matrix with the features of other weighted distance matrixes outputted by other convolutional layers to obtain the output features.

In an embodiment, the number of the Hausdorff convolutional layers in the encoder is not less than two. The computer device calculating the convolution of the neighboring point set with the distance matrix and the network weight matrix in the Haussdorff convolutional layer in the encoder to obtain the high-dimensional point cloud features includes following steps. In the process of calculating the convolution in a first Hausdorff convolution layer, the neighboring point set, as input features, is convolved with the distance matrix and the network weight matrix, to obtain output features. For a non-first Hausdorff convolutional layer, the output features of the previous Haussdorff convolutional layer of the current non-first Hausdorff convolutional layer, which are used as the input features of the current non-first Hausdorff convolutional layer, are convolved with the distance matrix and the network weight matrix, to obtain the output features. If the current non-first Hausdorff convolutional layer is the last Hausdorff convolutional layer, the output features of the last Hausdorff convolution layer are used as the high-dimensional point cloud features.

The computer device inputs the feature matrix, formed by the features of the data points in the neighboring point set of each data point, into the first Hausdorff convolutional layer to extract features of the first layer, and then inputs the features of the first layer into the second Hausdorff convolutional layer to extract features of the second layer till the last Hausdorff convolutional layer, and finally uses the features outputted by the last Hausdorff convolutional layer as the high-dimensional point cloud features. In an embodiment, the query radii corresponding to different Hausdorff convolutional layers are different from each other. Therefore, for each Hausdorff convolutional layer, the neighboring point set corresponding to each data point is recalculated. In an embodiment, the query radius corresponding to the Hausdorff convolutional layer doubles as the number of the Hausdorff convolutional layer increases. In an embodiment, the encoder includes five Hausdorff convolutional layers.

The computer device performs the feature extraction on the data points in the point cloud data layer by layer in the multiple Hausdorff convolution layers. The relatively high-dimensional semantic features may be extracted in each Hausdorff convolution layer based on the previous Hausdorff convolution layer, and thus the more abstract high-dimensional semantic features may be extracted, which improves the accuracy of semantic classification. Moreover, for the Hausdorff convolutional layers with different query radii, the corresponding neighboring point sets are also different from each other, that is, different Hausdorff convolutional layers in the encoder have different receptive fields, and the extracted features utilize contextual semantic information in different three-dimensional spaces. Therefore, the final extracted high-dimensional point cloud features merge the features of neighboring point sets of different sizes, and are more accurate.

Figure 5:
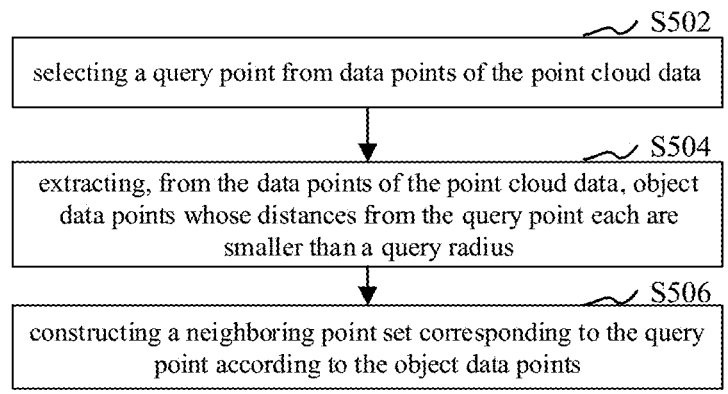
FIG. 5 is a schematic flowchart of a method for constructing a neighboring point set according to an embodiment.

In an embodiment, as shown in FIG. 5, the computer device constructing the corresponding neighboring point set for each of the data points in the point cloud data, includes the following steps S502 to S502.

At step S502, the computer device selects a query point from the data points of the point cloud data.

At step S504, the computer device extracts, from the data points of the point cloud data, object data points whose distances from the query point each are smaller than a query radius.

At step S506, the computer device constructs a neighboring point set corresponding to the query point according to the object data points.

The computer device takes each of the data points in the point cloud data as a query point, and creates the neighboring point set of the query point based on the query radius R thereof. For example, the query point is $p_0$, the computer device takes the query point $p_0$ as a center of a circle, queries the object data points in the point cloud data, whose distances from the query point $p_0$ each are within the query radius, and constructs the neighboring point set Q corresponding to the query point $p_0$ according to the object data points, where $Q=\{p_i | \|p_i-p_0\|<R\}$.

In an embodiment, the computer device may also take the query point $p_0$ as the center to construct a region with a shape other than a circle, and extract the data points of the point cloud data, which are in the region with the shape, to construct the neighboring point set of the query point.

The computer device constructs the neighboring point set of each of the data points in the point cloud data. The constructed neighboring point set is equivalent to the receptive field of the pixels in the two-dimensional image, and thus by convolving the features of the neighboring point set of each of the data points to obtain the features of each of the data points, the computer device may perform the feature extraction on the data point.

In an embodiment, the Hausdorff distances include a first shortest distance and a second shortest distance. The computer device calculating the Hausdorff distances between the neighboring point set and the pre-constructed kernel point cloud to obtain the distance matrix includes: calculating the first shortest distances between the data points in the neighboring point set and the kernel point cloud, respectively, and forming the first shortest distances into a first shortest distance set, calculating the second shortest distances between the data points in the kernel point cloud and the neighboring point set, respectively, and forming the second shortest distances into a second shortest distance set, and calculating the distance matrix according to the first shortest distance set and the second shortest distance set.

Assuming that Q represents the neighboring point set, G represents the kernel point cloud, then the first shortest distance from each point $q_i$ ($q_i \in Q$) in the neighboring point set Q to the kernel point cloud G is:

$$d(q_i, G) = \min_{g \in G} \|g - q_i\|,$$

where g denotes the data point in the kernel point cloud. The second shortest distance from each data point $g_i$ ($g_i \in G$) in the kernel point cloud G to the neighboring point set Q is $$d(g_i, Q) = \min_{q \in Q} \|g_i - q\|.$$

The computer device constructs the first shortest distance set and the second shortest distance set according to the acquired first shortest distances and the second shortest distances, respectively. The first shortest distance set is $S_{QG}$, and $S_{QG} = \cup_{q_i \in Q} d(q_i, G)$, and the second shortest distance set is $S_{GQ}$, and $S_{GQ} = \cup_{g_i \in G} d(g_i, Q)$.

$M_{min}$ represents the distance matrix calculated by the computer device according to the first shortest distance set and the second shortest distance set, and $$M_{min}(i, j) = \begin{cases} \|g_j - q_i\| & \text{if } \|g_j - q_i\| \in S_{GQ} \cup S_{QG} \\ 0 & \text{otherwise} \end{cases},$$

where i and j are positive integers greater than or equal to 1, and are the subscript indices of the data points in the kernel point cloud G and the neighboring point set Q, respectively. Since the second shortest distance set $S_{QG}$ includes the shortest distances of the data points in the neighboring point set Q from the kernel point cloud G, and the second shortest distance set $S_{GQ}$ includes the shortest distance of the data points in the kernel point cloud G from the neighboring point set Q, the Hausdorff distances may measure the distances between the neighboring point set to the kernel point cloud in a bidirectional perspective. Only the values belonging to $S_{QG}$ and $S_{GQ}$ are kept in the distance matrix $M_{min}$, and the other values are set to zero, in the comparison process of the point cloud data, therefore valuable information is kept in the distance matrix $M_{min}$, thus eliminating the influence of redundant data, and effectively avoiding the interference of noise.

In an embodiment, after the computer device calculates the Hausdorff distances between the neighboring point set and the pre-constructed kernel point cloud, and obtains the distance matrix, the method further includes: calculating ratios of non-zero elements in the distance matrix to a query radius, calculating and obtaining a normalized distance matrix according to the ratios, and convolving the neighboring point set with the normalized distance matrix and the network weight matrix in the Hausdorff convolution layer in the encoder.

The distance matrix is $M_{min}$, the query radius is R, the ratio of the non-zero element in the distance matrix to the query radius is $M_{min}(i, j)/R$. The computer device normalizes the distance matrix to be in an interval of (0, 1) by $1 - M_{min}(i, j)/R$.

Figure 6:
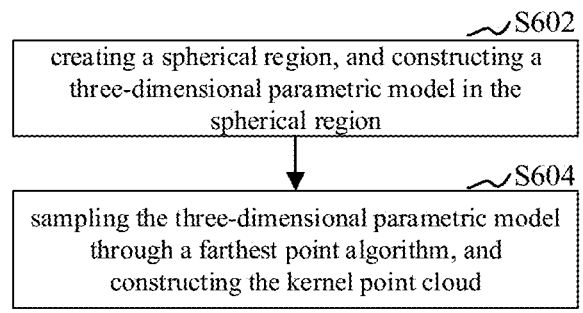
FIG. 6 is a schematic flowchart of a method for constructing a kernel point cloud according to an embodiment.

In an embodiment, as shown in FIG. 6, before calculating the Hausdorff distances between the neighboring point set and the pre-constructed kernel point cloud, the method further includes the following steps S602 to S604.

At step S602, the computer device creates a spherical region, and constructs a three-dimensional parametric model in the spherical region.

At step S604, the computer device samples the three-dimensional parametric model through a farthest point algorithm, and constructs the kernel point cloud.

The three-dimensional parametric model is a model representing a geometric shape, for example, may be a function representing a geometric shape, which may be a point, a line, a surface, and a solid. For example, the line is a straight line, the surface is a plane, and the solid is a sphere. Therefore, the three-dimensional parametric model may be a function representing a point, a line, a surface, and a volume. These geometric shapes may be well embedded in the three-dimensional neighborhood space, and maintain the symmetry of the shape, and the sphere also satisfies the rotation invariance. The three-dimensional parametric model is not limited to the model representing a point, a line, a surface, and a solid, but may also be models representing other geometric shapes.

Figure 7:
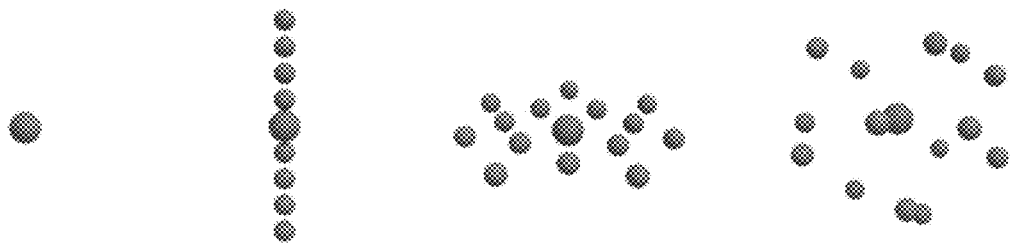
FIG. 7 is a schematic diagram showing kernel point clouds according to an embodiment.

The computer device may preset the number of samples that are sampled by the farthest point algorithm, and construct the kernel point cloud according to sample points sampled from the three-dimensional parametric model. For example, as shown in FIG. 7, from left to right, the kernel point clouds of the point shape, the line shape, the surface shape, and the solid shape are shown. The size of the kernel point cloud constructed by the computer device is a normalized scale, which may be changed with the change of the query radius during the convolution calculation and is consistent with the query radius.

In an embodiment, the Hausdorff convolution layer in the encoder includes multi-kernel Hausdorff convolution sublayers. Different multi-kernel Hausdorff convolution sublayers correspond to different distance matrixes. The convolving the neighboring point set with the distance matrix and the network weight matrix in the Hausdorff convolution layer in the encoder to obtain the high-dimensional point cloud features includes: in each of the multi-kernel Hausdorff convolution sublayers, convolving the neighboring point set with the network weight matrix and the distance matrix corresponding to each of the multi-kernel Hausdorff convolution sublayers to obtain point cloud features of each of the multi-kernel Hausdorff convolution sublayers, and merging the point cloud features of each of the multi-kernel Hausdorff convolution sublayers to obtain the high-dimensional point cloud features.

The Hausdorff convolution layer in the encoder includes a plurality of multi-kernel Hausdorff convolution sublayers. Different multi-kernel Hausdorff convolution sublayers correspond to different kernel point clouds, that is, the distance matrixes calculated by different convolution layers based on the neighboring point sets and the kernel point clouds are different from each other. After the corresponding point cloud features are calculated and obtained by each of the multi-kernel Hausdorff convolution sublayers, the encoder merges the point cloud features of each of the multi-kernel Hausdorff convolution sublayers to obtain the high-dimensional point cloud features. Merging the point cloud features may be addition or weighted addition of the point cloud features, or be merging the processed point cloud features, and the processing may be a linear or non-linear processing.

Figure 8:
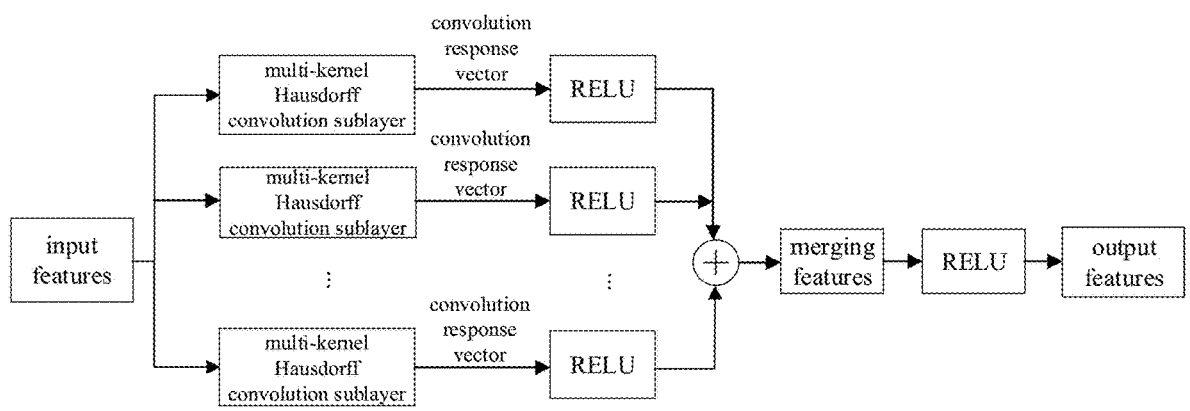
FIG. 8 is a schematic principle diagram of a multi-kernel Hausdorff convolution method according to an embodiment.

In an embodiment, as shown in FIG. 8, the Hausdorff convolution layer includes $n_k$ multi-kernel Hausdorff convolution sublayers. The convolution calculation is performed in the multi-kernel Hausdorff convolution sublayer to obtain the corresponding convolution response vector $C_{out}$. According to Equation $\tilde{C}_{out} = RELU(\Sigma_{n_{k=1}} RELU(C_{out}))$, the computer device firstly processes each of the convolution response vectors through an activation function RELU, then accumulates the processed convolution vectors to obtain an accumulated vector sum, and then processes the accumulated vector sum according to the activation function to obtain the merged features $\tilde{C}_{out}$. The activation function RELU may be a nonlinear function. Processing the convolution response vector through the activation function may increase the nonlinear component of a single convolution response vector. The computer device processes $\Sigma_{n_{k=1}} RELU(C_{out})$ through the nonlinear activation function to nonlinearly map the accumulated $RELU(C_{out})$, to construct the merged features.

In an embodiment, the computer device splices the convolution response vectors output by the multi-kernel Hausdorff convolution sublayers, and merges the convolution response vectors through splicing. In another embodiment, the computer device maps the convolution response vectors, output by the multiple multi-kernel Hausdorff convolution sublayers, onto one-dimensional data through a multi-layer perceptron, so as to merge the convolution response vectors.

Since the real-time sparse point cloud data lacks geometric information, the computer device calculating and obtaining the distance matrix based on the Hausdorff distances may extract the similarity between the neighboring point set and the kernel point cloud by the method of explicit geometric comparison, to supplement geometric information for the sparse point cloud data, which increases the interpretability of the three-dimensional point cloud convolution method. The Hausdorff distances adopt a bidirectional measurement method, and compares the similarity from the perspective of the neighboring point set and from the perspective of the kernel point cloud, and finally combine the comparison results obtained from the two perspectives to obtain the distance matrix.

Figures 9A, 9B, 9C, 9D:
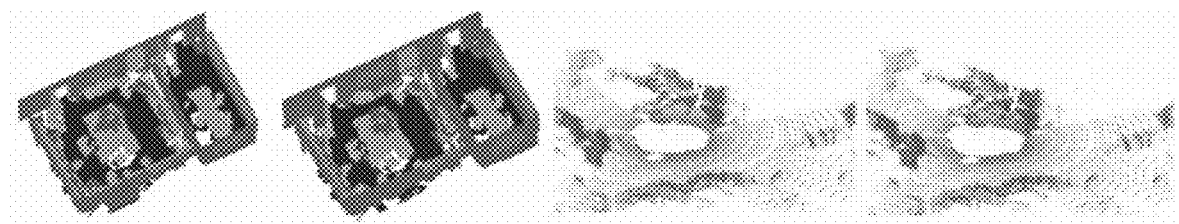
FIG. 9*a* is a schematic diagram showing a ground truth of scene label for an S3DIS dataset according to an embodiment.
FIG. 9*b* is a schematic diagram showing a result of a semantic classification of an S3DIS dataset by a deep learning neural network according to an embodiment.
FIG. 9*c* is a schematic diagram showing a ground truth of scene label for a SemanticKITTI dataset according to an embodiment.
FIG. 9*d* is a schematic diagram showing a result of a semantic classification of a SemanticKITTI dataset by a deep learning neural network according to an embodiment.

In an embodiment, the point cloud data may be an S3DIS dataset and a SemanticKITTI dataset, respectively. The deep learning neural network includes five Hausdorff convolutional layers, and the query radius of the current Hausdorff convolutional layer is twice that of the previous Hausdorff convolutional layer. FIG. 9a shows a ground truth of the scene labels of the S3DIS dataset, and FIG. 9b shows the result of the semantic classification of the S3DIS dataset obtained by the deep learning neural network. FIG. 9c shows a ground truth of the scene label for the SemanticKITTI dataset, and FIG. 9d shows the result of the semantic classification of the SemanticKITTI dataset obtained by the deep learning neural network. The objects with the same semantics are represented by a unified color, and the objects with the same semantic should have the same color in the two diagrams. As can be seen from FIGS. 9a to 9d, the deep learning neural network may better distinguish the main semantic objects in the scenes, and maintain the segmentation integrity and accuracy of the main semantic objects. In addition, the deep learning neural network is more effective for sparse or dense data. The deep learning neural networks may perform complete semantic classification for the semantic objects according to the geometric shapes of objects, which fully demonstrates the learning ability of the deep learning neural network.

In an embodiment, the point cloud data is the S3DIS data set. The computer device uses sequences 1-4, 6 as a training set, uses a sequence 5 as a test set, uses the three-dimensional spherical kernel point cloud as the kernel point cloud for the single-kernel Hausdorff convolution, and uses a mean of Intersection Over Union (mIOU) as an indicator to measure the accuracy of the results of the semantic classification of the deep learning neural network. When the Hausdorff convolution layer of the deep learning neural network is a single-kernel Hausdorff convolution layer, the mIOU of the results of semantic classification is 66.7%. When the Hausdorff convolutional layer of the deep learning neural network is a multi-kernel Hausdorff convolutional layer, the mIOU of the results of the semantic classification is 68.2%.

In an embodiment, the point cloud data is the SemanticKITTI data set. The computer device uses sequences 0-7, 9-10 as a training set, and uses a sequence 8 as a test set. When the Hausdorff convolutional layer of the deep learning neural network is a single-kernel Hausdorff convolutional layer, the mIOU of the results of the semantic classification is 59.6%. When the Hausdorff convolutional layer of the deep learning neural network is a multi-kernel Hausdorff convolutional layer, the mIOU of the results of the semantic classification is 60.3%. Since the SemanticKITTI dataset is a dataset formed by scanning outdoor scenes, the results of the semantic classification of the deep learning neural network prove that the deep learning neural network including the Hausdorff convolution is effective for the classification of outdoor single-frame point cloud data.

It should be understood that although the steps in the flowcharts of FIGS. 2 and 5-6 are shown in sequence according to the arrows, these steps are not necessarily performed in the sequence indicated by the arrows. Unless explicitly stated herein, the performing of these steps is not strictly limited to the order, and these steps may be performed in other orders. Moreover, at least part of the steps in FIGS. 2 and 5-6 may include multiple steps or multiple stages. These steps or stages are not necessarily performed and completed at the same time, but may be performed at different times. The performing order of these steps or stages steps is not necessarily sequential, but may be performed in turn or alternately with other steps or at least part of the steps or stages in the other steps.

Figure 10:
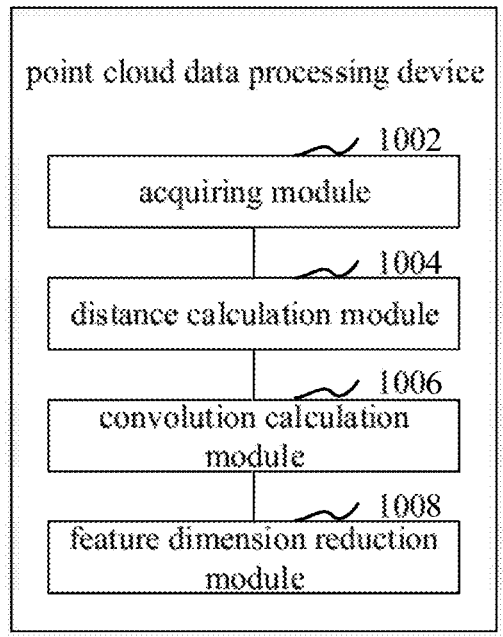
FIG. 10 is a block diagram showing a structure of a point cloud data processing device according to an embodiment.

In an embodiment, as shown in FIG. 10, a point cloud data processing device is provided, and includes an acquiring module, a distance calculation module, a convolution calculation module and a feature dimension reduction module.

The acquiring module 1002 is configured to acquire point cloud data, and construct a corresponding neighboring point set for each of data points in the point cloud data.

The distance calculation module 1004 is configured to calculate Hausdorff distances between the neighboring point set and a pre-constructed kernel point cloud to obtain a distance matrix.

The convolution calculation module 1006 is configured to calculate convolution of the neighboring point set with the distance matrix and a network weight matrix in a Hausdorff convolution layer in an encoder to obtain high-dimensional point cloud features. The encoder and a decoder are two parts in a deep learning network.

The feature dimension reduction module 1008 is configured to reduce feature dimension of the high-dimensional point cloud features through the decoder, so that a classifier can perform semantic classification on the point cloud data according to object point cloud features obtained by reducing the dimension.

In the above embodiments, the computer device acquires the point cloud data, constructs the corresponding neighboring point set for each of the data points in the point cloud data, and then calculates the Hausdorff distances between the neighboring point set and the pre-constructed kernel point cloud, to obtain the distance matrix. The computer device calculates the convolution of the neighboring point set with the distance matrix and the network weight matrix in the Hausdorff convolution layers in the encoder, to obtain the high-dimensional point cloud features. Then, the decoder reduces the dimension of the high-dimensional point cloud features, so that the classifier may perform the semantic classification on the point cloud data according to the object point cloud features obtained by reducing the dimensional. The computer device obtains the distance matrix by calculating the Hausdorff distances, calculates the convolution of the neighboring point cloud with the distance matrix, and then weights the result of the convolution calculation with the network weight matrix, to obtain the final high-dimensional point cloud features, so as to realize the feature extraction of the point cloud data. In this way, the extracted high-dimensional point cloud features have high accuracy, and thus the result of the semantic classification, performed by the computer device based on the obtained high-dimensional point cloud features, has high accuracy.

In an embodiment, the number of Hausdorff convolution layers in the encoder is not less than two. The convolution calculation module 1006 is further configured to: in the process of calculating convolution in a first Hausdorff convolution layer, convolve the neighboring point set, which is used as input features, with the distance matrix and the network weight matrix, to obtain output features, and for a non-first Hausdorff convolutional layer, convolve the output features of the previous Haussdorff convolutional layer of the current non-first Hausdorff convolutional layer, which are used as input features of the current non-first Hausdorff convolutional layer, with the distance matrix and the network weight matrix, to obtain output features, and if the current non-first Hausdorff convolutional layer is the last Hausdorff convolutional layer, use the output features of the last Hausdorff convolution layer as the high-dimensional point cloud features.

In an embodiment, the acquiring module 1002 is further configured to: select a query point from data points of the point cloud data, and extract, from the data points of the point cloud data, object data points whose distances from the query point each are smaller than a query radius, and construct a neighboring point set corresponding to the query point according to the object data points.

In an embodiment, the Hausdorff distances include a first shortest distance and a second shortest distance. The distance calculation module 1004 is further configured to: calculate the first shortest distance between each of the data points in the neighboring point set and the kernel point cloud, respectively, and form the first shortest distances into a first shortest distance set, and calculate the second shortest distances between the data points in the kernel point cloud and the neighboring point set, respectively, and form the second shortest distances into a second shortest distance set, and calculate the distance matrix according to the first shortest distance set and the second shortest distance set.

Figure 11:
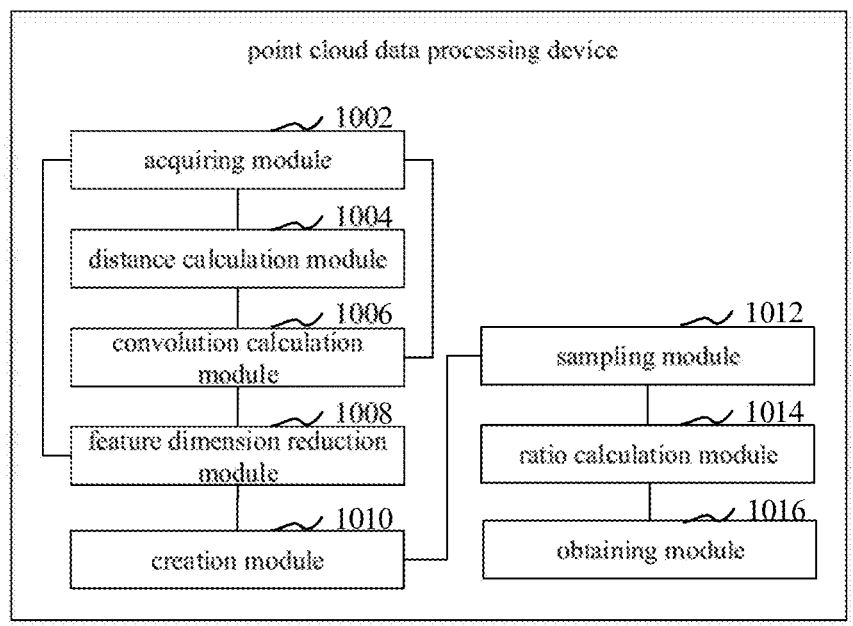
FIG. 11 is a block diagram showing a structure of a point cloud data processing device according to another embodiment.

In an embodiment, as shown in FIG. 11, the device further includes a creation module 1010 and a sampling module 1012.

The creation module 1010 is configured to create a spherical region and construct a three-dimensional parametric model in the spherical region.

The sampling module 1012 is configured to sample the three-dimensional parametric model through a farthest point algorithm to construct the kernel point cloud.

In an embodiment, the device further includes: a ratio calculation module 1014 and an obtaining module 1016.

The ratio calculation module 1014 is configured to calculate ratios of non-zero elements in the distance matrix to the query radius.

The obtaining module 1016 is configured to calculate and obtain a normalized distance matrix according to the ratios.

The convolution calculation module 1006 is further configured to convolve the neighboring point set with the normalized distance matrix and the network weight matrix in the Hausdorff convolution layer in the encoder.

In an embodiment, the Hausdorff convolution layer in the encoder includes multi-kernel Hausdorff convolution sublayers, and different multi-kernel Hausdorff convolution sublayers correspond to different distance matrixes. The convolution calculation module 1006 is further configured to: in each of the multi-kernel Hausdorff convolution sublayers, convolve the neighboring point set with the network weight matrix and the distance matrix corresponding to each of the multi-kernel Hausdorff convolution sublayers to obtain point cloud features of each of the multi-kernel Hausdorff convolution sublayers, and merge the point cloud features of each of the multi-kernel Hausdorff convolution sublayers to obtain the high-dimensional point cloud features.

For the specific definition of the point cloud data processing device, reference may be made to the definition of the point cloud data processing method above, and it will not be described repeatedly herein. Each of the modules in the above-mentioned point cloud data processing device may be implemented in whole or in part by software, hardware, and combinations thereof. The above modules may be embedded in or independent of a processor in a computer device in the form of hardware, or stored in a memory in a computer device in the form of software, so that the processor may call and execute the operations corresponding to the above modules.

In an embodiment, a computer device is provided. The computer device may be a server, and an internal structure diagram thereof may be shown in FIG. 12. The computer device includes a processor, a memory, and a network interface that are connected by a system bus. The processor of the computer device is configured to provide computing and control capabilities. The memory of the computer device includes a non-transitory storage medium, a memory. The non-transitory storage medium stores an operating system, a computer program, and a database. The memory provides an environment for running the operating system and the computer program in the non-transitory storage medium. The database of the computer device is configured to store the point cloud data processing data. The network interface of the computer device is configured to communicate with an external terminal through a network connection. The computer program, when executed by the processor, implements a point cloud data processing method.

In an embodiment, a computer device is provided. The computer device may be a terminal, and an internal structure diagram thereof may be shown in FIG. 13. The computer device includes a processor, a memory, a communication interface, a display screen, and an input device that are connected by a system bus. The processor of the computer device is configured to provide computing and control capabilities. The memory of the computer device includes a non-transitory storage medium, a memory. The non-transitory storage medium stores an operating system and a computer program. The memory provides an environment for running the operating system and the computer program in the non-transitory storage medium. The communication interface of the computer device is configured for wired or wireless communication with an external terminal, and the wireless communication can be realized by WIFI, operator network, near field communication (NFC) or other technologies. The computer program, when executed by the processor, implements a point cloud data processing method. The display screen of the computer device may be a liquid crystal display screen or an electronic ink display screen. The input device of the computer device may be a touch layer covering the display screen, or a button, a trackball or a touchpad provided on a housing of the computer device, or an external keyboard, a trackpad, or a mouse.

Figure 12:
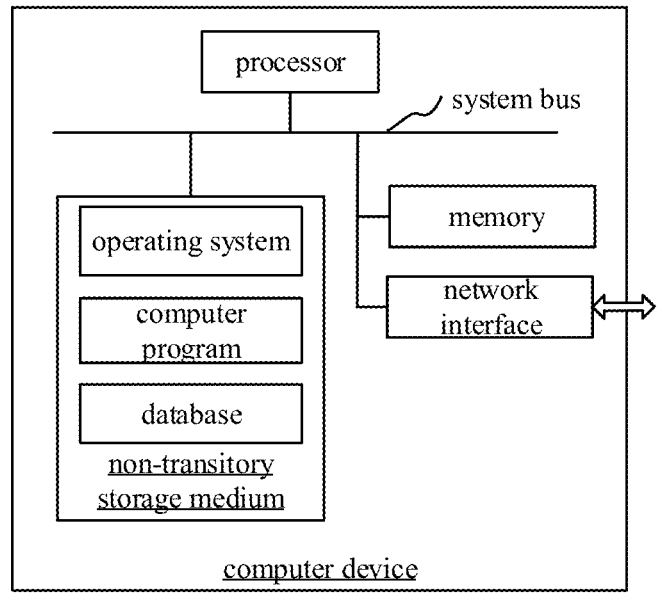
FIG. 12 is a diagram showing an internal structure of a computer device according to an embodiment.
Figure 13:
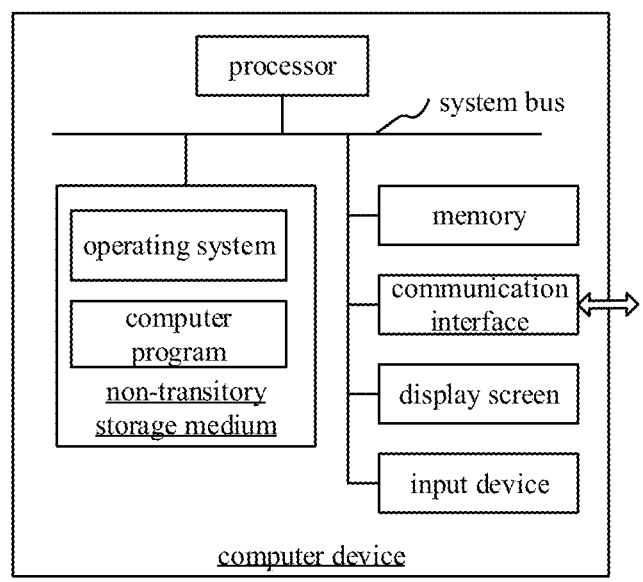
FIG. 13 is a diagram showing an internal structure of the computer device according to another embodiment.

Those skilled in the art may understand that the structures shown in FIGS. 12 and 13 are only block diagrams of partial structures related to the solution of the present disclosure, and do not constitute a limitation on the computer device to which the solution of the present disclosure is applied. A specific computer device may include more or fewer components than those shown in the figures, or combine some components, or have a different arrangement of components from that shown in the figures.

In an embodiment, a computer device is provided, and includes a memory and a processor. A computer program is stored in the memory. When executing the computer program, the processor performs the following steps: acquiring point cloud data, constructing a corresponding neighboring point set for each of data points in the point cloud data, calculating Hausdorff distances between the neighboring point set and a pre-constructed kernel point cloud to obtain a distance matrix, calculating a convolution of the neighboring point set with the distance matrix and a network weight matrix in a Hausdorff convolution layer in an encoder to obtain high-dimensional point cloud features, an encoder and a decoder being two parts in a deep learning network, and reducing feature dimension of the high-dimensional point cloud features through the decoder, so that a classifier performs semantic classification on the point cloud data according to object point cloud features obtained by the dimension reduction.

In an embodiment, the number of Hausdorff convolutional layers in the encoder is not less than two. When executing the computer program, the processor performs the following steps: in the process of calculating convolution in a first Hausdorff convolution layer, convolving the neighboring point set, which is used as input features, with the distance matrix and the network weight matrix, to obtain output features; in a non-first Hausdorff convolutional layer, convolving the output features of the previous Haussdorff convolutional layer of the current non-first Hausdorff convolutional layer, which are used as input features of the current non-first Hausdorff convolutional layer, with the distance matrix and the network weight matrix, to obtain output features; if the current non-first Hausdorff convolutional layer is the last Hausdorff convolutional layer, using the output features of the last Hausdorff convolution layer as the high-dimensional point cloud features.

In an embodiment, when executing the computer program, the processor further performs the following steps: selecting a query point from the data points of the point cloud data, extracting, from the data points of the point cloud data, object data points whose distances from the query point each are smaller than a query radius, and constructing a neighboring point set corresponding to the query point according to the object data points.

In an embodiment, the Hausdorff distances include a first shortest distance and a second shortest distance. When executing the computer program, the processor performs the following steps: calculating the first shortest distances between the data points in the neighboring point set and the kernel point cloud, respectively, forming the first shortest distances into a first shortest distance set, calculating the second shortest distances between the data points in the kernel point cloud and the neighboring point set, respectively, forming the second shortest distances into a second shortest distance set, and calculating the distance matrix according to the first shortest distance set and the second shortest distance set.

In an embodiment, when executing the computer program, the processor performs the following steps: creating a spherical region, constructing a three-dimensional parametric model in the spherical region, sampling the three-dimensional parametric model through a farthest point algorithm, and constructing the kernel point cloud.

In an embodiment, when executing the computer program, the processor performs the following steps: calculating ratios of non-zero elements in the distance matrix to the query radius, calculating and obtaining a normalized distance matrix according to the ratios, convolving the neighboring point set with the normalized distance matrix and the network weight matrix in the Hausdorff convolution layer in the encoder.

In an embodiment, the Hausdorff convolution layer in the encoder includes multi-kernel Hausdorff convolution sublayers. The different multi-kernel Hausdorff convolution sublayers correspond to different distance matrixes. When executing the computer program, the processor performs the following steps: in each of the multi-kernel Hausdorff convolution sublayers, convolving the neighboring point set with the network weight matrix and the distance matrix corresponding to each of the multi-kernel Hausdorff convolution sublayers to obtain point cloud features of each of the multi-kernel Hausdorff convolution sublayers, and merging the point cloud features of each of the multi-kernel Hausdorff convolution sublayers to obtain the high-dimensional point cloud features.

In an embodiment, a computer-readable storage medium is provided, on which a computer program is stored, and when executed by a processor, the computer program causes the professor to perform the following steps: acquiring point cloud data, constructing a corresponding neighboring point set for each of data points in the point cloud data, calculating Hausdorff distances between the neighboring point set and the pre-constructed kernel point cloud to obtain a distance matrix, calculating the convolution of the neighboring point set with the distance matrix and a network weight matrix in a Hausdorff convolution layer in an encoder to obtain high-dimensional point cloud features, the encoder and a decoder being two parts in a deep learning network, and reducing feature dimension of the high-dimensional point cloud features through the decoder, so that a classifier performs semantic classification on the point cloud data according to object point cloud features obtained by the dimension reduction.

In an embodiment, the number of Hausdorff convolutional layers in the encoder is not less than two. When executed by the processor, the computer program causes the processor to perform the following steps: in the process of calculating convolution in a first Hausdorff convolution layer, convolving the neighboring point set, which is used as input features, with the distance matrix and the network weight matrix, to obtain output features; in a non-first Hausdorff convolutional layer, convolving the output features of the previous Haussdorff convolutional layer of the current non-first Hausdorff convolutional layer, which are used as input features of the current non-first Hausdorff convolutional layer, with the distance matrix and the network weight matrix, to obtain output features; if the current non-first Hausdorff convolutional layer is the last Hausdorff convolutional layer, using the output features of the last Hausdorff convolution layer as the high-dimensional point cloud features.

In an embodiment, when executed by the processor, the computer program causes the processor to perform the following steps: selecting a query point from the data points of the point cloud data, extracting, from the data points of the point cloud data, object data points whose distances from the query point each are smaller than a query radius, and constructing a neighboring point set corresponding to the query point according to the object data points.

In an embodiment, the Hausdorff distances include a first shortest distance and a second shortest distance. When executed by the processor, the computer program causes the processor to perform the following steps: calculating the first shortest distances between the data points in the neighboring point set and the kernel point cloud, respectively, forming the first shortest distances into a first shortest distance set, calculating the second shortest distances between the data points in the kernel point cloud and the neighboring point set, respectively, forming the second shortest distances into a second shortest distance set, and calculating the distance matrix according to the first shortest distance set and the second shortest distance set.

In an embodiment, when executed by the processor, the computer program causes the processor to further perform the following steps: creating a spherical region, constructing a three-dimensional parametric model in the spherical region, sampling the three-dimensional parametric model through a farthest point algorithm, and constructing the kernel point cloud.

In an embodiment, when executed by the processor, the computer program causes the processor to further perform the following steps: calculating ratios of non-zero elements in the distance matrix to the query radius, calculating and obtaining a normalized distance matrix according to the ratios, convolving the neighboring point set with the normalized distance matrix and the network weight matrix in the Hausdorff convolution layer in the encoder.

In an embodiment, the Hausdorff convolution layer in the encoder includes multi-kernel Hausdorff convolution sublayers. The different multi-kernel Hausdorff convolution sublayers correspond to different distance matrixes. when executed by the processor, the computer program causes the processor to further perform the following steps: in each of the multi-kernel Hausdorff convolution sublayers, convolving the neighboring point set with the network weight matrix and the distance matrix corresponding to each of the multi-kernel Hausdorff convolution sublayers to obtain point cloud features of each of the multi-kernel Hausdorff convolution sublayers, and merging the point cloud features of each of the multi-kernel Hausdorff convolution sublayers to obtain the high-dimensional point cloud features.

Those of ordinary skill in the art may understand that all or part of the processes in the methods of the above embodiments may be implemented by relevant hardware instructed by a computer program. The computer program may be stored in a non-transitory computer-readable storage medium. When the computer program is executed, the processes of the embodiments of the above-mentioned method may be included. Any reference to memory, storage, database, or other media used in the various embodiments of the disclosure may include at least one of non-transitory and transitory memory. The non-transitory memory may include read-only memory (ROM), magnetic tape, floppy disk, flash memory, or optical memory, and the like. The transitory memory may include random access memory (RAM) or external cache memory. As illustration but not limitation, the RAM may be in various forms, such as Static Random Access Memory (SRAM) or Dynamic Random Access Memory (DRAM).

The technical features of the above-described embodiments may be combined arbitrarily. To simplify the description, not all possible combinations of the technical features in the above embodiments are described. However, all of the combinations of these technical features should be considered to be within the scope of the present disclosure, as long as such combinations do not contradict with each other.

The foregoing embodiments merely illustrate some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements fall in the protection scope of the present disclosure. Therefore, the protection scope of the present disclosure shall be subject to the appended claims.

What is claimed is:

1. A point cloud data processing method, comprising:
   acquiring point cloud data, and constructing a corresponding neighboring point set for each of data points in the point cloud data;
   calculating Hausdorff distances between the neighboring point set and a pre-constructed kernel point cloud to obtain a distance matrix;
   calculating a convolution of the neighboring point set with the distance matrix and a network weight matrix in a Hausdorff convolution layer in an encoder to obtain high-dimensional point cloud features; the encoder and a decoder being two parts in a deep learning network; and
   reducing feature dimension of the high-dimensional point cloud features through the decoder, so that a classifier performs semantic classification on the point cloud data according to object point cloud features obtained by the dimension reduction.

2. The point cloud data processing method according to claim 1, wherein the number of Hausdorff convolutional layers in the encoder is not less than two; and the calculating a convolution of the neighboring point set with the distance matrix and the network weight matrix in the Hausdorff convolution layer in the encoder to obtain the high-dimensional point cloud features comprises:
   in a process of calculating convolution in a first Hausdorff convolution layer, convolving the neighboring point set, which is used as input features, with the distance matrix and the network weight matrix, to obtain output features; and
   in a non-first Hausdorff convolutional layer, convolving output features of a previous Hausdorff convolutional layer of a current non-first Hausdorff convolutional layer, which are used as input features of the current non-first Hausdorff convolutional layer, with the distance matrix and the network weight matrix, to obtain output features, and if the current non-first Hausdorff convolutional layer is a last Hausdorff convolutional layer, using output features of the last Hausdorff convolution layer as the high-dimensional point cloud features.

3. The point cloud data processing method according to claim 1, wherein the constructing the corresponding neighboring point set for each of data points in the point cloud data comprises:
   selecting a query point from the data points of the point cloud data;
   extracting, from the data points of the point cloud data, object data points whose distances from the query point each are smaller than a query radius; and
   constructing a neighboring point set corresponding to the query point according to the object data points.

4. The point cloud data processing method according to claim 1, wherein the Hausdorff distances comprise a first shortest distance and a second shortest distance; and the calculating the Hausdorff distances between the neighboring point set and the pre-constructed kernel point cloud to obtain the distance matrix comprises:
- calculating first shortest distances between the data points in the neighboring point set and the kernel point cloud, respectively, and forming the first shortest distances into a first shortest distance set;
- calculating second shortest distances between data points in the kernel point cloud and the neighboring point set, respectively, and forming the second shortest distances into a second shortest distance set; and
- calculating the distance matrix according to the first shortest distance set and the second shortest distance set.

5. The point cloud data processing method according to claim 1, wherein, prior to the calculating the Hausdorff distances between the neighboring point set and the pre-constructed kernel point cloud, the method further comprises:
- creating a spherical region, and constructing a three-dimensional parametric model in the spherical region; and
- sampling the three-dimensional parametric model through a farthest point algorithm, and constructing the kernel point cloud.

6. The point cloud data processing method according to claim 1, wherein:
- after the calculating the Hausdorff distances between the neighboring point set and the pre-constructed kernel point cloud to obtain the distance matrix, the method further comprises:
  - calculating ratios of non-zero elements in the distance matrix to a query radius; and
  - calculating and obtaining a normalized distance matrix according to the ratios; and
- the calculating the convolution of the neighboring point set with the distance matrix and the network weight matrix in the Hausdorff convolution layer in the encoder comprises:
  - convolving the neighboring point set, with the normalized distance matrix and the network weight matrix in the Hausdorff convolution layer in the encoder.

7. The point cloud data processing method according to claim 1, wherein:
- the Hausdorff convolution layer in the encoder comprises multi-kernel Hausdorff convolution sublayers;
- different multi-kernel Hausdorff convolution sublayers correspond to different distance matrixes; and
- the calculating the convolution of the neighboring point set with the distance matrix and the network weight matrix in the Hausdorff convolution layer in the encoder to obtain the high-dimensional point cloud features comprises:
  - in each of the multi-kernel Hausdorff convolution sublayers, convolving the neighboring point set with the network weight matrix and the distance matrix corresponding to each of the multi-kernel Hausdorff convolution sublayers to obtain point cloud features of each of the multi-kernel Hausdorff convolution sublayers; and
  - merging the point cloud features of each of the multi-kernel Hausdorff convolution sublayers to obtain the high-dimensional point cloud features.

8. The point cloud data processing method according to claim 1, wherein each Hausdorff convolutional layer in the encoder comprises a plurality of Hausdorff convolution modules, and different Hausdorff convolution modules have different query scales.

9. The point cloud data processing method according to claim 1, wherein the point cloud data is a three-dimensional point cloud data.

10. The point cloud data processing method according to claim 1, wherein the point cloud data is obtained by scanning objects in a road environment by a lidar on a driverless vehicle.

11. The point cloud data processing method according to claim 1, wherein the point cloud data is obtained by scanning objects in a space environment by a depth camera on an artificial intelligence robot.

12. The point cloud data processing method according to claim 2, wherein a query radius of a current Hausdorff convolutional layer is twice that of a previous Hausdorff convolutional layer.

13. The point cloud data processing method according to claim 2, wherein five Hausdorff convolutional layers are configured in the encoder.

14. The point cloud data processing method according to claim 6, wherein elements in the normalized distance matrix are $1-M_{min}(i, j)/R$, wherein, $M_{min}$ denotes the distance matrix, R denotes the query radius, $M_{min}(i, j)/R$ denotes ratios of the non-zero elements in the distance matrix to the query radius.

15. The point cloud data processing method according to claim 7, wherein the merging the point cloud features of each of the multi-kernel Hausdorff convolution sublayers comprising adding or weighted adding the point cloud features.

16. The point cloud data processing method according to claim 7, wherein the merging the point cloud features of each of the multi-kernel Hausdorff convolution sublayers to obtain the high-dimensional point cloud features comprises: splicing convolution response vectors output by the multi-kernel Hausdorff convolution sublayers to merge the convolution response vectors to obtain the high-dimensional point cloud features.

17. The point cloud data processing method according to claim 7, wherein the merging the point cloud features of each of the multi-kernel Hausdorff convolution sublayers to obtain the high-dimensional point cloud features comprises: mapping convolution response vectors, output by the multiple multi-kernel Hausdorff convolution sublayers, onto one-dimensional data through a multi-layer perceptron to merge the convolution response vectors to obtain the high-dimensional point cloud features.

18. A computer device, comprising a memory storing a computer program, and a processor, wherein, the processor, when executing the computer program, performs steps of the method according to claim 1.

19. A non-transitory computer-readable storage medium, on which a computer program is stored, wherein, the computer program, when executed by a processor, causes the processor to perform steps of the method according to claim 1.

20. A point cloud data processing device, comprising:
- an acquiring module, configured to acquire point cloud data, and construct a corresponding neighboring point set for each of data points in the point cloud data;
- a distance calculation module, configured to calculate Hausdorff distances between the neighboring point set and a pre-constructed kernel point cloud to obtain a distance matrix;

a convolution calculation module, configured to calculate a convolution of the neighboring point set with the distance matrix and a network weight matrix in a Hausdorff convolution layer in an encoder to obtain high-dimensional point cloud features; the encoder and a decoder being two parts in a deep learning network; and a feature dimension reduction module, configured to reduce feature dimension of the high-dimensional point cloud features through the decoder, so that a classifier performs semantic classification on the point cloud data according to object point cloud features obtained by the dimension reduction.

\* \* \* \* \*